(No Model.)

L. W. YAGGY.
ANATOMICAL CHART.

No. 396,381. Patented Jan. 15, 1889.

Witnesses:
Albert H. Adams.
E. A. West.

Inventor:
Levi W. Yaggy

UNITED STATES PATENT OFFICE.

LEVI W. YAGGY, OF CHICAGO, ILLINOIS, ASSIGNOR TO THE WESTERN PUBLISHING HOUSE, OF SAME PLACE.

ANATOMICAL CHART.

SPECIFICATION forming part of Letters Patent No. 396,381, dated January 15, 1889.

Application filed October 1, 1888. Serial No. 286,847. (No model.)

*To all whom it may concern:*

Be it known that I, LEVI W. YAGGY, residing at Chicago, in the county of Cook and State of Illinois, and a citizen of the United States, have invented a new and useful Improvement in Anatomical Charts, of which the following is a specification, reference being had to the accompanying drawings, in which—

Figure 1:
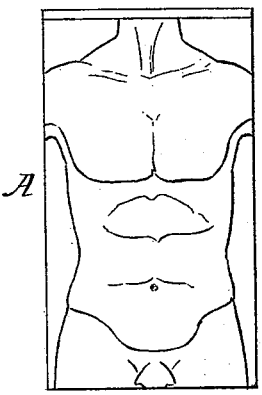
Figure 2:
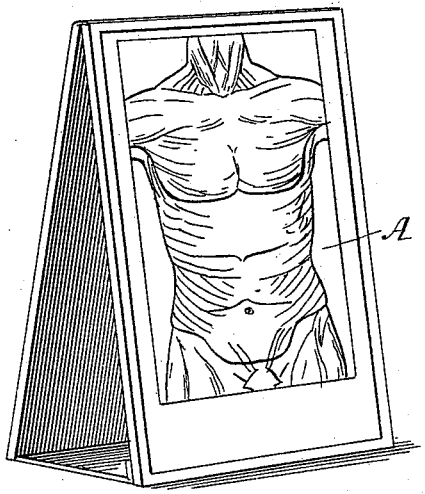
Figure 3:
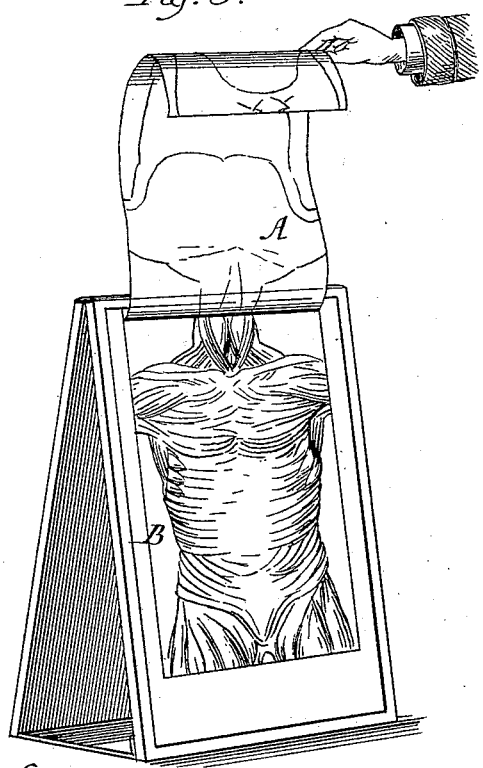
Figure 4:
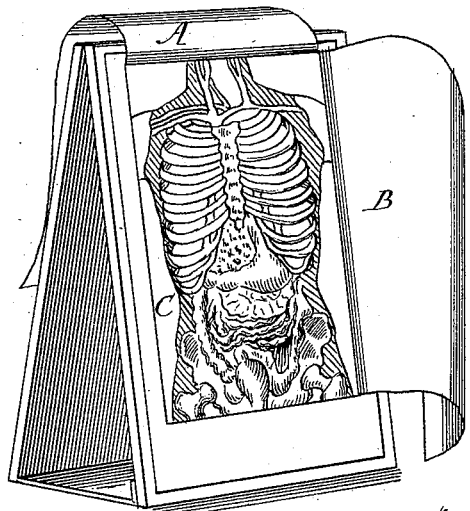

Figure 1 is a front elevation representing the first sheet of my chart, such sheet being detached from the other parts. This first sheet is transparent or semi-transparent. Fig. 2 is a perspective showing my improved chart mounted upon a portfolio-standard, the first sheet being exposed to view. Fig. 3 is a perspective, the first sheet being thrown up so as to fully expose the next sheet. Fig. 4 is a perspective showing the first sheet turned away from the other sheets and the second sheet turned outward so as to expose fully the next sheet.

My present invention is an improvement upon an anatomical chart for which Letters Patent No. 340,270 were granted on my application, which chart was designed to illustrate the trunk of the human body, and the organs therein contained, by means of a series of charts on separate sheets hinged so that they could be turned back, one after another.

The present invention consists in providing a transparent or semi-transparent sheet having thereon a representation of a front view of the exterior of the trunk in its natural condition, and combining such sheet with the other sheets of the chart in such manner that it can be brought over any one or more of the sheets of the chart exposed at any one time to view, its proper relation to the several sheets of the charts being constantly maintained, so that the position of any exposed part or organ relatively to the front exterior of the body can be seen.

In the drawings, A represents the first or outer sheet, upon which is a representation of a front view of the exterior of the trunk of the body in its natural condition. This sheet is to be made of tracing-linen or other suitable transparent or semi-transparent material, so that the chart over which it may be placed can be seen quite clearly through the transparent sheet.

B represents the second sheet, which contains a view similar to that upon sheet A, except that the cuticle is removed so as to show the muscular organization.

C is a third sheet, which contains a representation of the trunk in section, the plane of the section being midway of the body and extending from side to side.

The sheet A is flexibly attached to the upper edge of the sheet C, care being taken that its position relatively to the sheet beneath it shall be correct. The sheet B is flexibly attached to one edge of the sheet C. Between the sheet B and the sheet C there are a number of secondary and smaller sheets or flaps, designed to expose and illustrate the several internal organs and show their position in relation to each other, all of which secondary sheets are to be attached by a flexible hinge either to the sheet C or to some sheet which is attached to the sheet C in such manner that the secondary sheets can be turned either outward or downward. It is not necessary to describe these secondary sheets. They may be like similar sheets described in my former patent, or additional secondary sheets may be used, at pleasure.

As shown, the completed chart, consisting of any desired number of sheets connected together by flexible hinges, is mounted upon a portfolio-standard; but it may be mounted in any other suitable manner, or may be used unmounted.

By means of the transparent sheet, upon which is an exterior view of the trunk, the position of the several organs relatively to the exterior of the trunk can be readily determined, and in case of gunshot or other wounds the organs injured by such wound can be readily determined.

What I claim as new, and desire to secure by Letters Patent, is as follows:

In an anatomical chart, a series of sheets flexibly connected together, each having thereon a representation of some part or organ of the body, in combination with a transparent or semi-transparent sheet having thereon a front view of the exterior of the trunk and flexibly connected with the main part of the chart, whereby such transparent sheet can be brought over any one or more of
5. the remaining sheets of the chart which may be at any one time exposed to view and the position of such exposed sheet or sheets relative to the front exterior of the body can be seen through such transparent sheet, substantially as specified.

LEVI W. YAGGY.

Witnesses:
ALBERT H. ADAMS,
E. A. WEST.